July 4, 1944.　　W. T. COCKRILL ET AL　　2,352,939
ELECTRODE HOLDER
Filed Feb. 10, 1943　　3 Sheets-Sheet 1

Inventor
William T. Cockrill
Thomas J. Duncan

By Clarence A. O'Brien
and Harvey B. Jacobson
Attorneys

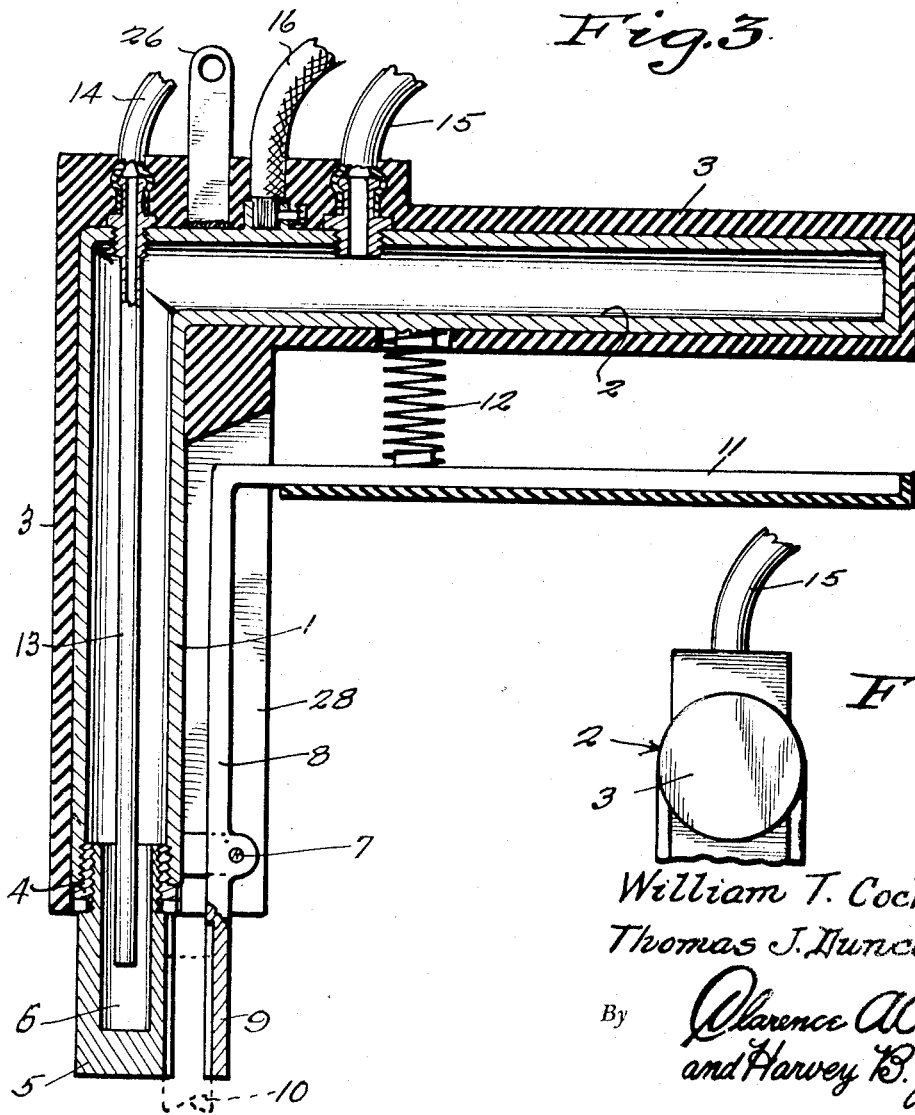

July 4, 1944. W. T. COCKRILL ET AL 2,352,939
ELECTRODE HOLDER
Filed Feb. 10, 1943 3 Sheets-Sheet 3
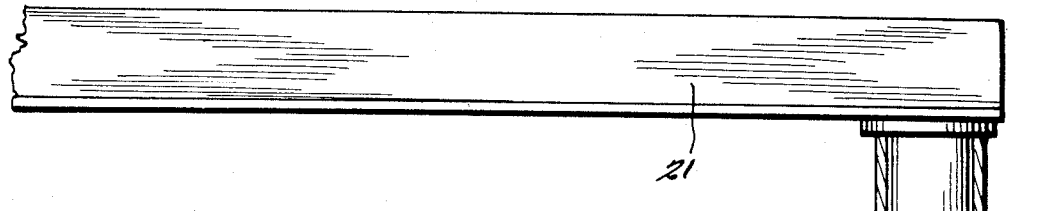
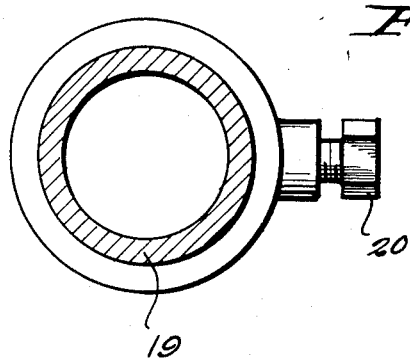
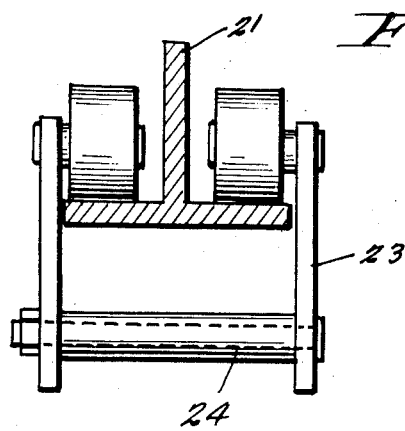
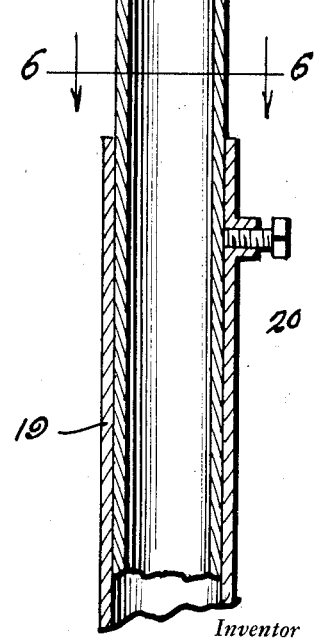
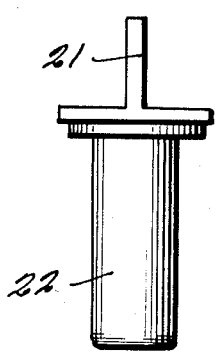
Inventor
William T. Cockrill
Thomas J. Duncan
By Clarence A. O'Brien
and Harvey B. Jacobson
Attorneys Patented July 4, 1944

2,352,939

UNITED STATES PATENT OFFICE 2,352,939

ELECTRODE HOLDER

William T. Cockrill and Thomas J. Duncan,
Flint, Mich.

Application February 10, 1943, Serial No. 475,412

1 Claim. (Cl. 219—8)

The present invention relates to new and useful improvements in welding electrode holders, particularly for comparatively large electrodes, and has for its primary object to provide, in a manner as hereinafter set forth, a device of this character comprising unique cooling means.

Another very important object of the invention is to provide a welding apparatus of the character described which embodies novel means for supporting the holder.

Other objects of the invention are to provide a welding apparatus of the character set forth which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a bottom plan view of the electrode holder.

Figure 3 is a view in vertical section through the electrode holder, taken substantially on the line 3—3 of Figure 2.

Figure 4 is an elevational view, looking at one end of the handle of the holder.

Figure 5 is a view principally in vertical section through a portion of the boom.

Figure 6 is a view in horizontal section, taken substantially on the line 6—6 of Figure 5.

Figure 7 is a cross sectional view, taken substantially on the line 7—7 of Figure 1.

Figure 8 is a view in elevation, looking at the inner end of the swinging boom arm, showing the means for mounting said arm on the tubular, telescopic standard.

Figure 1:
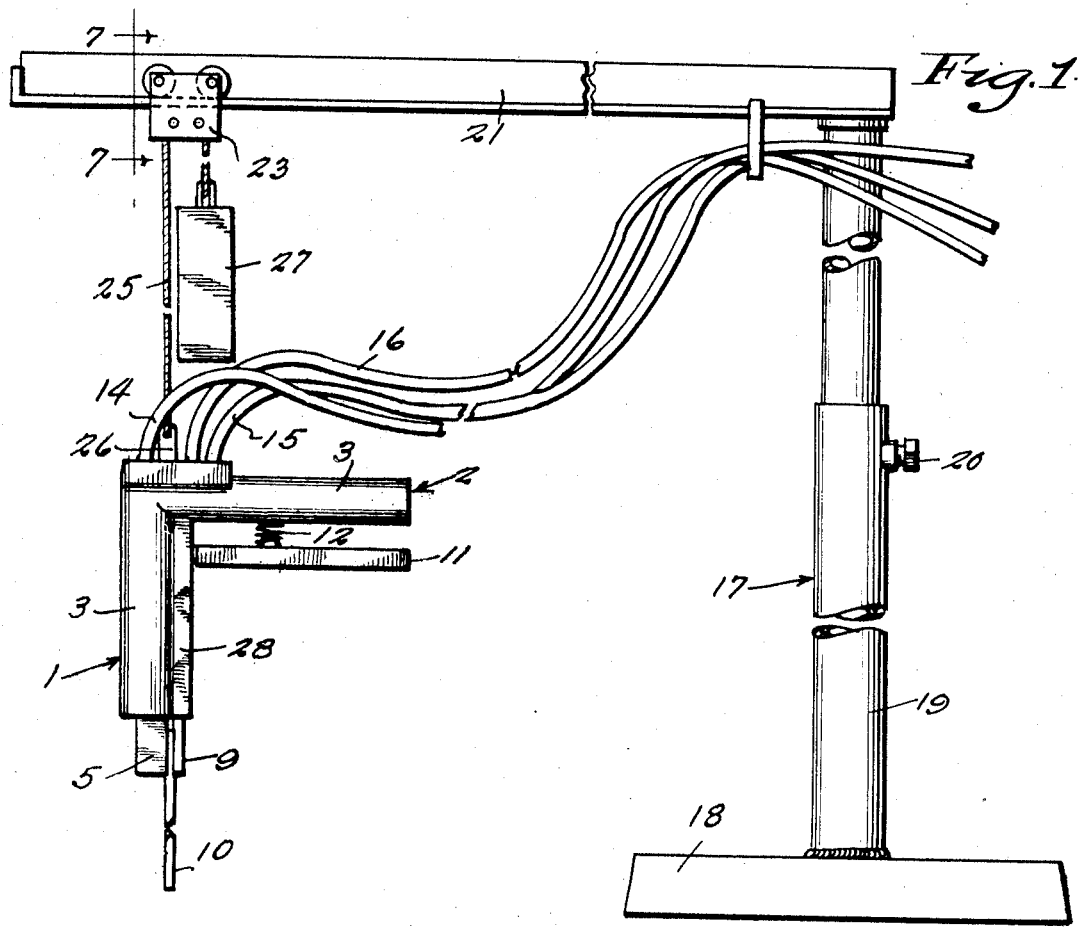
Figure 1 is a view in side elevation of an apparatus constructed in accordance with the present invention.
Figure 9:
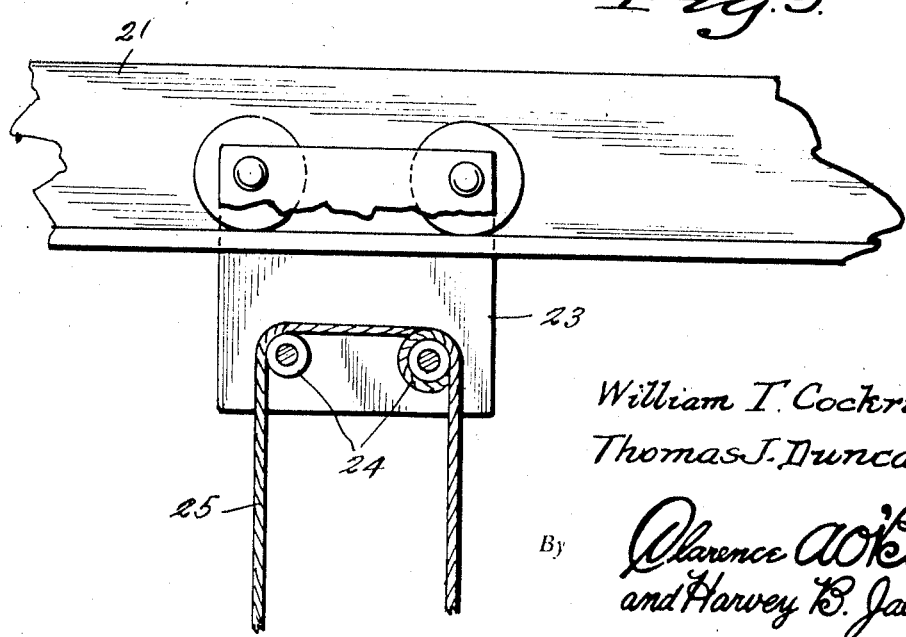
Figure 9 is an enlarged elevation of the carriage with parts broken away.

Referring now to the drawings in detail, it will be seen that the embodiment of the invention which has been illustrated comprises a tubular member 1 of suitable metal. Projecting at right angles from one end of the tubular member 1 and communicating therewith is a tubular handle 2. The member 1 and the handle 2 are enclosed in suitable insulation 3.

Threadedly mounted in the other end portion of the tubular member 1 is a bushing 4. A stationary jaw 5 is threadedly mounted in the bushing 4, said stationary jaw having a chamber 6 therein communicating with the member 1.

Pivotally mounted at an intermediate point, as at 7, on the lower portion of the tubular member 1 is a lever 8. On one end of the lever 8 is an integral swinging jaw 9 which is cooperable with the stationary jaw 5 for firmly securing an electrode, as at 10. Projecting at an angle from the other end of the lever 8 is an insulated handle 11. A coil spring 12 between the handles 2 and 11 actuates the lever 8 in a manner to close the jaw 9 on the electrode 10 for firmly holding said electrode.

Mounted centrally in the tubular member 1 is a copper pipe 13 which extends downwardly into the chamber 6 of the stationary jaw 5, said pipe being open at its lower end. A water supply conduit 14, from any suitable source, is connected to the upper end of the pipe 13. A water discharge or return conduit 15 is connected to the forward portion of the handle 2. Also connected to the forward portion of the handle 2 is a conductor cable 16.

The electrode holder is suspended from a boom which is designated generally by reference numeral 17. The boom 17 includes a suitable base 18 having mounted thereon a telescopically adjustable, tubular standard 19. A set screw 20 secures the telescopic sections of the standard 19 in adjusted position.

Projecting horizontally from the upper end of the tubular standard 19 is an arm 21 of substantially T-shaped cross section. Fixed on the inner end portion of the arm 21 and depending therefrom is a spindle or the like 22 which is journaled in the upper end portion of the tubular standard 19. This is shown to advantage in Figure 5 of the drawings. It will thus be seen that the arm 21 is adapted to swing in a complete circle in a horizontal plane on the standard 19.

A carriage 23 is operable on the arm 21. In the embodiment shown, the carriage 23 includes the pulleys 24. Trained over the pulleys 24 is a cable 25. One end of the cable 25 is secured at 26 to the electrode holder. A counterweight 27 is suspended from the other end of the cable 25.

It is thought that the operation of the invention will be readily apparent from a consideration of the foregoing. Briefly, water enters the holder from the conduit 14 and flows downwardly through the copper pipe 13 into the chamber 6. This water then flows upwardly through the tubular member 1 around the pipe 13, enters the tubular handle 2 and leaves the holder through the conduit 15. It will thus be seen that the entire holder will be kept cool at all times for permitting it to be handled in comfort by the mechanic. Of course, the pivoted jaw 9 is opened for inserting an electrode or removing a stub by simply actuating the handle 11 against the tension of the coil spring 12. The boom 17 materially assists in supporting the holder at any desired location within a given radius of the standard 19. Also, the adjustability of the telescopic standard 19 facilitates supporting the holder at any desired elevation. The insulation 3 on the tubular member 1 is formed to provide a pair of spaced flanges 28 between which the lever 8 is operable. This is illustrated to advantage in Figure 3 of the drawings. The substantially L-shaped design of the holder facilitates handling the device and, in addition, permits a clear, unobstructed view to be had of the work at all times. Substantially all of the electrode is consumed, thereby substantially eliminating or materially reducing waste. The counterbalanced supporting means for the holder facilitates its use over a long period of time without fatiguing the mechanic. Further, the water cooling feature, in addition to promoting comfort, permits the use of the largest electrodes.

It is believed that the many advantages of a welding apparatus constructed in accordance with the present invention will be readily understood, and although a preferred embodiment of said apparatus is as illustrated and described, it is to be understood that changes in the details of construction and in the combination and arrangement of parts may be resorted to which will fall within the scope of the invention as claimed.

Having described the invention, what is claimed as new is:

An electrode holder comprising a tubular member, a tubular handle extending at right angles from one end of said member and communicating therewith, insulation substantially enclosing the member and the handle, said insulation including a pair of spaced, opposed flanges on the member, a stationary jaw mounted on the other end of the member, said jaw having a chamber therein communicating with said member, water supply and discharge conduits communicating with the member, a lever pivotally mounted on the member between the flanges, a jaw on one end of the lever cooperable with the stationary jaw for holding an electrode, and an insulated handle projecting angularly from the other end of the lever adjacent the first-named handle.

WILLIAM T. COCKRILL.
THOMAS J. DUNCAN.